United States Patent [19]
Hansson

[11] Patent Number: 4,838,364
[45] Date of Patent: Jun. 13, 1989

[54] ELECTRICALLY POWERED SCREW TIGHTENING TOOL

[76] Inventor: Gunnar C. Hansson, of72, Karlavägen, S-114 59 Stockholm, Sweden

[21] Appl. No.: 123,796

[22] Filed: Nov. 23, 1987

[30] Foreign Application Priority Data

Nov. 27, 1986 [SE] Sweden ............................ 8605086

[51] Int. Cl.[4] ........................................ B23B 45/00
[52] U.S. Cl. ...................................... 173/170; 173/12
[58] Field of Search .................. 173/12, 170; 200/157, 200/153 T; 81/461, 475; 192/150

[56] References Cited

U.S. PATENT DOCUMENTS 3,419,087 12/1968 Amtsberg et al. .................... 173/12
3,970,151 7/1976 Workman, Jr. ....................... 173/12

FOREIGN PATENT DOCUMENTS 0063460 10/1982 European Pat. Off. .

*Primary Examiner*—Frank T. Yost
*Assistant Examiner*—James L. Wolfe

[57] ABSTRACT

An electrically powered screw tightening tool including a motor (11) which via a torque transmitting mechanism (12) is coupled to an output shaft (13) for applying torque to a screw joint. The torque transmitting mechanism (12) comprises a torque responsive clutch (16) and a trip device (19) by which an axially extending release rod (23) is supported during operation of the tool. A switch (14) is provided to supply electric power to the motor (11), and a control mechanism including an operator activated manoeuver device (37) and an activating device (28) associated with the release rod (23) is arranged to cause shifting of the switch (14) between an OFF-condition and an ON-condition. The activating device (28) is actuated both by the manoeuver device (37) and the release rod (23).

7 Claims, 1 Drawing Sheet

ELECTRICALLY POWERED SCREW TIGHTENING TOOL

BACKGROUND OF THE INVENTION

This invention relates to an electrically powered screw tightening tool.

In particular, the invention concerns a tool of the above type comprising a housing, an electric rotation motor, torque transmitting means connecting said motor to an output shaft and including a torque responsive clutch and a trip means associated with said clutch, an axially displaceable release rod supported by said trip means and extending axially through said motor, a switch located in said housing and shiftable between an ON-condition and an OFF-condition for controlling the power supply to said motor, and a manoeuver means supported in said housing and movable in a direction substantially transverse to the rotation axis of said motor between a rest position and an active position.

The main object of the invention is to provide a simple mechanism by which the power supply switch of the tool is operable both by the clutch controlled release rod and by the operator controlled manoeuver means.

SUMMARY OF THE INVENTION

A tool of the above described type having a mechanism according to the invention is characterized by an activating means which on one hand is connected to and conjointly movable with said release rod and which on the other hand is coupled to said manoeuver means for displacement together therewith in said substantially transverse direction, said activating means being arranged to engage said switch and to cause shifting of the latter from said OFF-condition to said ON-condition when displaced together with said manoeuver means as a the latter is moved from said rest position to said active position and to cause shifting of said switch from said ON-condition to said OFF-condition when displaced axially together with said release rod as the latter is released by said trip means.

A preferred embodiment of the invention is hereinbelow described in detail with reference to the accompanying drawing.

DETAILED DESCRIPTION

Figure 1A:
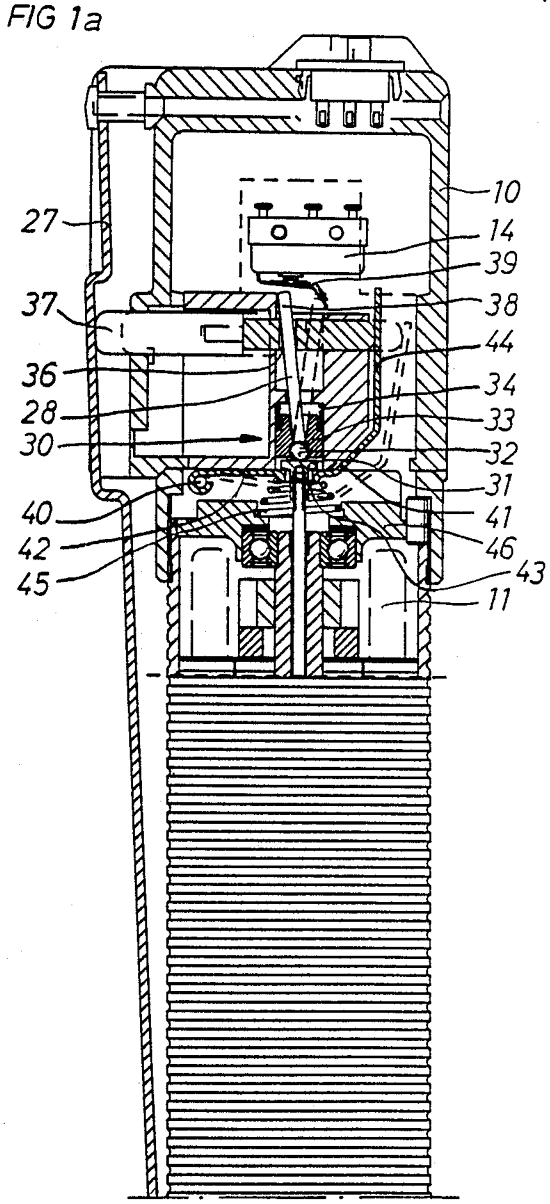
FIGS. 1*a* and 1*b* show together, partly in section, a side view of a screw tightening tool according to the invention.

The tool illustrated on the drawing is an electrically powered angle nut runner comprising a housing 10 in which is supported an electric rotation motor 11, torque transmitting means 12 coupling the motor 11 to an output shaft 13, and a power supply means in the form of a switch 14.

The torque transmitting means 12 includes a drive shaft 15 and a torque responsive clutch 16 which comprises a spring biassed, axially movable sleeve 17, a number of conical rollers 18 and a transversely displaceable trip element 19. The latter has an oblique end surface 20 and is spring biassed into contact with an oblique surface 21 on the sleeve 17. The trip element 19 is formed with an axially directed aperture 22. A release rod 23 extends axially through the motor 11 and the drive shaft 15 and is endwise supported by the trip element 19. A driven shaft 24 is provided with a cam portion 25 which forms part of the clutch 16 and which cooperates with the rollers 18 to transmit torque to the shaft 24.

The torque transmitting means 12 is of a previously known design commonly used in pneumatically powered screw driving tools.

The switch 14 by which the motor 11 is supplied with electric power is shiftable in an axial direction between an ON-condition and an OFF-condition. Shifting of the switch 14 from OFF-condition to ON-condition is accomplished manually by the operator via an external lever 27, whereas shifting of the switch 14 from ON-condition to OFF-condition takes place automatically by the action of the torque responsive clutch 16, the trip element 19 and the release rod 23.

The mechanism by which the switch 14 is shifted comprises an activating rod 28 which is coupled with its one end to the release rod 23 via a universal joint 30. The latter comprises a flat head 31 rigidly mounted on the release rod 23, a steel ball 32 pressed against the head 31 by a hollow piston 33, and a spring 34 biassing the piston 33 axially toward the release rod 23.

The activating rod 28 is endwise supported on the steel ball 32 and extends through a transverse opening 36 in a manoeuver plunge 37 which is arranged to be activated by the lever 27. The manoeuver plunge 37 is movably guided in the housing 10 for displacement in a direction transverse to the rotation axis of the motor 11 and the release rod 23. The rear end 38 of the activating rod 28 is arranged to form a cam means together with a slanted lever 39 on the switch 14. The lever 39 is spring biassed toward the OFF-condition of the switch 14.

A reset lever 41 has the shape of an L and is pivotally supported on a transverse pin 40 in the housing 10 by the end of one of its legs 42. This leg 42 comprises an aperture 43 through which the release rod 23 extends. The other leg 44 of the reset lever 41 is arranged to engage the inner end of the manoeuver plunge 37. A compression spring 45 acts between a transverse wall 46 in the housing 10 and the leg 42 of the reset lever 41.

The operation of the tool is commenced by the external lever 27 being pressed by the operator to thereby shift the switch 14 and accomplish a supply of electric power to the motor 11. It is to be understood, however, that the switch operating mechanism as well as the torque transmitting clutch 16 at this stage occupy their reset, unreleased positions and that, accordingly, the switch 14 is in its OFF-condition. Before starting the tool a nut socket is fitted to the output shaft 13 and brought into engagement with a screw joint to be tightened.

Figure 1B:
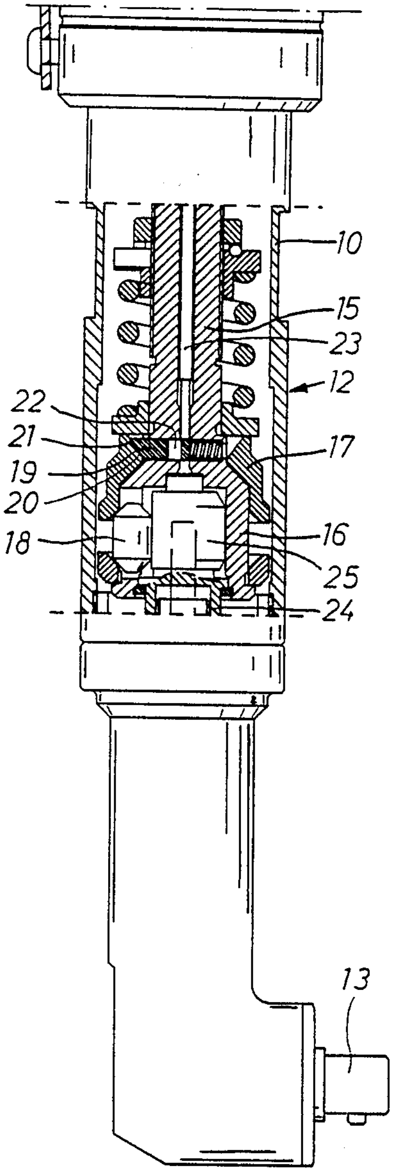

In the above mentioned unreleased position of the clutch 16 the trip element 19 occupies the position illustrated in FIG. 1*b*, wherein the aperture 22 is out of alignment with the release rod 23 and the latter is axially supported by the trip element 19. This means that the release rod 23 as well as the activating rod 28 occupy their rearmost positions.

When the lever 27 is pressed the manoeuver plunge 37 is moved to the right in FIG. 1*a*, thereby swinging the activating rod 28 to a position illustrated in phantom lines. During this swinging movement of the activating rod 28, the rear end 38 of the latter engages by caming action the slanted lever 39 of the switch 14 and shifts the latter from OFF-condition to ON-condition. Now, the motor 11 is supplied with electric power and starts delivering a torque to the shaft 15, the clutch 16 and the output shaft 13.

As the torque resistance increases to a certain level in the screw joint being tightened, the cam portion 25 of the driven shaft 24 starts to urge the rollers 18 outwardly such that the conical ends of the latters displaces the sleeve 17 upwards. Due to cooperation between the oblique end surface 20 of the trip element 19 and the oblique surface 21 of the sleeve 17 the trip element 19 is displaced to the right against its spring bias. The aperture 22 in the trip element 19 is brought into alignment with the release rod 23 whereby the latter falls down through the aperture 22. An axial movement of the release rod 23 is obtained as a result of a certain torque level is reached in the screw joint being tightened. This movement results in a forward displacement of the activating rod 28 as well, which means that the lever 39 of the switch 14 by spring action may resume its original position, i.e. its OFF-condition. Hereby, the power supply to the motor 11 is interrupted and the tightening process is finished.

To be able to repeat the tightening process, the switch activating means has to be restored. This is accomplished simply by letting out the manoeuver lever 27, enabling the reset lever 41 by action of spring 45 to pull the release rod 23 back rearwards against the action of spring 34 such that the forward end of the release rod 23 is raised above the trip element aperture 22. The trip element 19 is thereby free to resume its left hand position in which the aperture 22 is out of alignment with the release rod 23. Simultaneously, the other leg 44 of the reset lever 41 urges the manoeuver plunge 37 to the left, thereby bringing the activating rod 28 with it such that the rear end 38 of the latter is displaced out of engagement with the slanted lever 39 of the switch 14. A full operating cycle is now completed.

The device according to the invention is advantageous in that it provides a simple mechanism for semiautomatic control of the power supply via a single switch.

I claim:

1. An electrically powered screw tightening tool, comprising:

a housing (10);

an electric rotation motor (11);

torque transmitting means (12) connecting said motor (11) to an output shaft (13) and including a torque responsive clutch (16) and a trip means (19) associated with said clutch (16);

an axially displaceable release rod (23) supported by said trip means (19) and extending axially through said motor (11);

switch means (14) located in said housing (10) and being shiftable between an ON-condition and an OFF-condition for controlling a power supply to said motor (11);

manoeuver means (37) supported in said housing (10) and being movable in a direction substantially transverse to the rotation axis of said motor (11) between a rest position and an active position;

activating means (28) coupled to and conjointly movable with said release rod (23) and which is also coupled to said manoeuver means (37) for displacement together with said manoeuver means (37) in said substantially transverse direction, said activating means (28) including means for engaging said switch means (14) and for causing shifting of said switch means (14) from said OFF-condition to said ON-condition when displaced together with said manoeuver means (37) as said manoeuver means (37) is moved from said rest position to said active position and for causing shifting of said switch means (14) from said ON-condition to said OFF-condition when displaced axially together with said release rod (23) as said release rod (23) is released by said trip means (19).

2. The tool of claim 1, wherein:

said switch means (14) is arranged to be shifted between said ON-condition and said OFF-condition in a direction substantially parallel to the rotation axis of said motor (11); and said switch means (14) comprises cam means (39) for cooperation with said activating means (28), said cam means (39) being arranged to translate a movement of said activating means (28) in said substantially transverse direction into said direction substantially parallel to the rotation axis of said motor (11).

3. The tool of claim 1 or 2, further comprising spring actuated reset means (41) supported in said housing (10) for engaging both said release rod (23) and said manoeuver means (37) for moving said release rod (23) toward its unreleased position and for moving said manoeuver means (37) toward said rest position thereof.

4. The tool of claim 3, wherein said reset means (41) comprises an L-shaped lever having a pair of legs (42, 44), said L-shaped lever being pivotally supported in said housing (10) and being arranged to engage said release rod (23) with one of its legs (42) and to engage said manoeuver means (37) with its other leg (44).

5. The tool of claim 4, wherein said activating means (28) comprises an articulated extension of said release rod (23).

6. The tool of claim 3, wherein said activating means (28) comprises an articulated extension of said release rod (23).

7. The tool of claim 1 or 2, wherein said activating means (28) comprises an articulated extension of said release rod (23).

* * * * *